(12) United States Patent
Sakurai et al.

(10) Patent No.: US 11,358,555 B2
(45) Date of Patent: Jun. 14, 2022

(54) VEHICLE SEAT

(71) Applicant: Autoliv Development AB, Vargarda (SE)

(72) Inventors: Tsutomu Sakurai, Kanagawa (JP); Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/282,161

(22) PCT Filed: Sep. 16, 2019

(86) PCT No.: PCT/JP2019/036259
§ 371 (c)(1),
(2) Date: Apr. 1, 2021

(87) PCT Pub. No.: WO2020/071099
PCT Pub. Date: Apr. 9, 2020

(65) Prior Publication Data
US 2021/0354649 A1  Nov. 18, 2021

(30) Foreign Application Priority Data

Oct. 3, 2018 (JP) .............................. JP2018-188121

(51) Int. Cl.
*B60R 21/207* (2006.01)
*B60N 2/427* (2006.01)
*B60R 21/231* (2011.01)

(52) U.S. Cl.
CPC ............ *B60R 21/207* (2013.01); *B60N 2/427* (2013.01); *B60R 21/23138* (2013.01); *B60R 2021/23146* (2013.01)

(58) Field of Classification Search
CPC ............ B60R 21/207; B60R 21/23138; B60R 2021/23146; B60R 2021/23308;
(Continued)

(56) References Cited

U.S. PATENT DOCUMENTS 9,056,591 B2* 6/2015 Fujiwara ............... B60R 21/233
9,592,789 B2* 3/2017 Fujiwara ............. B60R 21/2342
(Continued)

FOREIGN PATENT DOCUMENTS

CN    104093606 A    10/2014
CN    104228748 A    12/2014
(Continued)

*Primary Examiner* — Drew J Brown
(74) *Attorney, Agent, or Firm* — Harness, Dickey & Pierce, P.L.C.; Stephen T. Olson (57) ABSTRACT

An airbag which is a constituent of a side airbag device installed in the vehicle seat according to the present invention is provided with a main chamber which deploys toward the front of a side support portion of the seat, and a sub-chamber which accommodates an inflator and which deploys at a position inward of the main chamber in the width direction of the vehicle. The main chamber is divided, by means of a baffle panel, into a main front chamber at the front, and a main rear chamber at the rear. The sub-chamber is linked to the main rear chamber at a side in the width direction of the vehicle. When the airbag is deployed, the baffle panel extends along a front edge of the sub-chamber, as viewed from the width direction of the vehicle.

11 Claims, 8 Drawing Sheets

A2-A2 cross section (58) Field of Classification Search
CPC ........ B60R 21/233; B60R 2021/23324; B60N 2/427; B60N 2002/5808
See application file for complete search history.

(56) References Cited

U.S. PATENT DOCUMENTS

| | | | |
|---|---|---|---|
| 9,969,351 B2* | 5/2018 | Ohno | B60R 21/233 |
| 2009/0020988 A1* | 1/2009 | Sato | B60R 21/23138 280/730.2 |
| 2015/0014970 A1 | 1/2015 | Fujiwara | |
| 2015/0367811 A1 | 12/2015 | Kobayashi et al. | |
| 2017/0174174 A1* | 6/2017 | Ohno | B60R 21/233 |
| 2017/0369020 A1 | 12/2017 | Hiraiwa et al. | |
| 2018/0022308 A1 | 1/2018 | Kunisada et al. | |
| 2018/0186326 A1 | 7/2018 | Kobayashi et al. | |
| 2018/0222435 A1 | 8/2018 | Fukawatase et al. | |
| 2019/0135219 A1 | 5/2019 | Kobayashi et al. | |

FOREIGN PATENT DOCUMENTS

| | | | | |
|---|---|---|---|---|
| CN | 104968537 A | 10/2015 | | |
| CN | 107640118 A | 1/2018 | | |
| CN | 107848483 A | 3/2018 | | |
| CN | 108382348 A | 8/2018 | | |
| CN | 109153362 A | 1/2019 | | |
| DE | 102014008599 A1 | 12/2014 | | |
| EP | 3357764 A1 * | 8/2018 | | B60N 2/42 |
| ES | 2302953 T3 * | 8/2008 | | B60R 21/207 |
| JP | 2009-023494 A | 2/2009 | | |
| JP | 2014-80169 A | 5/2014 | | |
| JP | 2014-237411 A | 12/2014 | | |
| JP | 2017-24673 A | 2/2017 | | |
| JP | 2017-109623 A | 6/2017 | | |
| JP | 2017-226381 A | 12/2017 | | |
| JP | 2018-12475 A | 1/2018 | | |
| JP | 2018-122812 A | 8/2018 | | |
| KR | 10-2009-0027979 A | 3/2009 | | |
| KR | 10-2012-0100201 A | 9/2012 | | |
| KR | 10-2018-0002763 A | 1/2018 | | |
| KR | 10-2018-0090749 A | 8/2018 | | |
| KR | 10-2018-0132822 A | 12/2018 | | |
| WO | 2012/118324 A2 | 9/2012 | | |
| WO | 2013/114591 A1 | 8/2013 | | |
| WO | 2014/123055 A1 | 8/2014 | | |
| WO | 2017/010169 A1 | 1/2017 | | |
| WO | WO-2017010169 A1 * | 1/2017 | | A47C 31/02 |
| WO | 2017/209192 A1 | 12/2017 | | |

* cited by examiner

A2-A2 cross section

VEHICLE SEAT

TECHNICAL FIELD

The present invention relates to a vehicle seat equipped with a side airbag device.

BACKGROUND

In order to protect passengers in the event of a vehicle accident, it is well known that vehicles are equipped with one or more airbags. These airbags include, for example, various forms such as: a so-called driver airbag which expands from near the center of the steering wheel of an automobile so as to protect a driver; a curtain airbag which deploys downward along an inner side of a window of the automobile so as to protect passengers during collisions in a transverse direction of the vehicle, as well as when overturning and during rollover accidents; and a side airbag which is deployed between the passenger and a side panel so as to protect the passenger upon impact in the transverse direction of the vehicle. The present invention relates to a side airbag device and a vehicle seat provided with same.

The side airbag device described in the below mentioned Patent Document 1 includes a main airbag along with an auxiliary airbag. In addition, prior to the main airbag, the auxiliary airbag is expanded and deployed to restrain occupants at an early stage. In addition to the invention described in Patent Document 1, a side airbag device including the auxiliary airbag as well as the main airbag is proposed. For these side airbag devices, there is a strong demand for a more compact device due to major installation area limitations.

Moreover, there is a demand for appropriate passenger protection performance due to improved deployment speed and stabilization of the deployed shape.

Furthermore, there is a need to prevent or reduce injury to the occupant through deployment of the side airbag even if the occupant is not seated normally in a vehicle seat (for example, in a so-called "out-of-position" state).

RELATED ART DOCUMENTS

Patent Documents

Patent Document 1: Japanese Unexamined Patent Application Publication No. 2009-023494

SUMMARY OF THE INVENTION

Problem to be Solved by the Invention

In view of the foregoing, an object of the present invention is to provide: a side airbag device capable of quickly and properly restraining an occupant; and a vehicle seat provided therewith.

Also, an additional object is to provide a side airbag device and a vehicle seat equipped with the side airbag device that can reduce injury to an occupant to a minimum through deployment of a side airbag even in conditions where the occupant is not seated normally.

Means for Solving the Problem

The following describes means for solving the abovementioned problem and the effect thereof. In the present invention, when an occupant is seated in a seat in a normal posture, the direction the occupant faces is referred to as the "front," the opposite direction is referred to as the "rear," and the direction indicating the coordinate axis is referred to as the "front-rear direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

In order to achieve the object described above, the present invention is applied to a vehicle seat having a seat cushion with a seat surface and a seat back forming a backrest and equipped with a side airbag device. The seat back is provided with a side support part that bulges forward at the side (end part) in the vehicle width direction. A side frame extending along a longitudinal direction of the side support part is arranged inside the side support part. The side airbag device is equipped with an airbag that restrains an occupant by expanding and deploying and an inflator that is provided on the inner side of the side frame in the vehicle width direction and supplies expansion gas to the airbag. The airbag has a main chamber that deploys toward the front of the side support part and a sub-chamber that houses the inflator and deploys on the occupant side relative to the main chamber. The main chamber is partitioned by a baffle panel into a main front chamber at the front and a main rear chamber at the rear. The sub-chamber is connected to the main rear chamber in the vehicle width direction. The baffle panel, when deployed, extends along the front edge of the sub-chamber when viewed from the vehicle width direction. Furthermore, the sub-chamber and the main rear chamber are configured to deploy only inside the side support part and not to expand outside the vehicle seat.

The "longitudinal direction of the side support part" generally corresponds to the side surface longitudinal direction of the seatback, and is a direction close to the vertical direction when the seat back is upright based on the reclining mechanism.

The "inner side of the main chamber in the vehicle width direction" can also be expressed as the inner side of the side support part or the occupant side (center of seat back).

Furthermore, the "baffle panel" is, for example, a flexible fabric panel that partitions the space in the vicinity of the center of the main chamber in the front/rear direction, and can be formed of the same fabric as the airbag body. When the baffle panel is "viewed in the vehicle width direction", the side edges (sides) of the panel are visible.

According to the present invention as described above, the sub-chamber deploys inside the side support part in the initial stage of airbag device operation, enabling prompt restraint of the occupant from moving outwardly in the vehicle width direction. Here, as deployment proceeds with reaction force of the sub-chamber deployment applied to the side frame, pressure from the occupant can be applied on the side frame even after deployment, enabling reliable restraint of the occupant in the direction of the center of the seat.

In addition, since the side support part protrudes and deforms toward the occupant and is shaped to push the occupant toward the inner side in the vehicle width direction, generation of a force that pushes the occupant obliquely forward from the back direction can be avoided or minimized, and movement of the occupant in the direction of pulling on the seat belt can be avoided. In other words, injury to the occupant can be suppressed, and restraining performance can be maximized.

When the sub-chamber expands, the main rear chamber will deploy in conjunction therewith, followed by deployment of the main front chamber. Here, the baffle panel is arranged to extend along the front edge of the sub-chamber, and the sub-chamber and main rear chamber deploy only inside the side support part. Therefore, for example, even when a child seated in the vehicle seat is in a so-called out-of-position (OOP) state, such as when the child is seated facing the seat back or when the child is sitting covering the side support part, the occupant will not be seriously injured. In other words, the sub-chamber and main rear chamber, which are in close proximity to the occupant and are first to deploy, deploy only inside the side support, thus avoiding a situation in which they bulge out of the side support part and directly apply a large impact on the occupant. On the other hand, the main front chamber, which expands from the side support part (seat), can reliably restrain the occupant's movement in the left-right direction over a wide area.

The baffle panel, when deployed, can be configured to extend along the front edge of the side support part when viewed from the vehicle width direction. Forming the front end of the main rear chamber, partitioned by the baffle panel, along the front edge of the side support part enables maximizing the volume of the main rear chamber and the sub-chamber that deploy only inside the side support part.

The structure of the sub-chamber and the main rear chamber when deployed can have approximately the same shape and area when viewed from the vehicle width direction. Use of this type of structure enables the expansion gas to flow from the sub-chamber to the main chamber quickly and without waste. If the main rear chamber is extremely small compared to the sub-chamber, the expansion gas flowing in from the sub-chamber will initially stagnate in the main rear chamber and then flow into the main front chamber, resulting in poor gas inflow (outflow) efficiency.

A structure where, upon deployment, the front edge of the sub-chamber is more forward than the front edge of the main rear chamber when viewed from the vehicle width direction can be used. This structure increases the restraint area of the occupant based by the sub-chamber, enabling quick and reliable restraint of the occupant's movement in the left-right direction during the initial stage of airbag deployment.

Upon deployment, the baffle panel can be provided in a straight line from the upper end to the lower end, sloping down so that the upper part is positioned towards the rear of the vehicle and the lower part is positioned towards the front of the vehicle. Here, the lower side surface area (volume) of the deployed main rear chamber and sub-chamber is increased, and the waist of the occupant can be reliably restrained. By pushing the waist part close to the center of gravity of the human body, the restraint performance of a passenger in the initial stage when an accident occurs can be improved. Note, the term "straight line" does not mean a geometrically accurate straight line, but rather a state in which the sides are generally straight when tension is applied to a flexible cloth, and does not exclude a slightly curved shape along the side shape of the side support part.

A first inner vent through which the expansion gas passes can be formed at the connection between the sub-chamber and the main rear chamber. Here, the first inner vent is preferably formed at least at two locations, upper and lower, so that the expansion gas can be fed uniformly into the main rear chamber.

A first seam can be formed on the periphery of the first inner vent connecting the sub-chamber and main rear chamber. In addition, a second seam is preferably formed in two locations surrounding the entire first inner vent and this improves the connection strength of the periphery of the first inner vent.

The baffle panel can have a second inner vent formed that is connected to the main front chamber and the main rear chamber.

Note that the side airbag device according to the present invention includes a type which is deployed on a door side (outer side) of the seat, and a type which is deployed on a vehicle center side of the seat. A side airbag device of a type which is deployed on the vehicle center side of the seat, for example, is referred to as a far side airbag, front center airbag, rear center airbag, and the like.

BRIEF DESCRIPTION OF THE DRAWINGS

FIG. 7 is a schematic plan view illustrating the panel structure of the airbag (before connection) according to the present invention, where (A) shows the main chamber and (B) shows the sub-chamber.

EMBODIMENT OF THE INVENTION

The vehicle seat with the side airbag device according to the embodiments of the present invention mounted thereon will be described with reference to the accompanying drawings. Note that "front" displayed in each figure denotes the front (traveling direction) of a vehicle, "rear" denotes the rear (on the side opposite the traveling direction) of the vehicle, "inside" denotes the inside in the vehicle width direction (on the passenger side), and "outside" denotes the outside in the vehicle width direction (on the door panel side).

Figure 1:
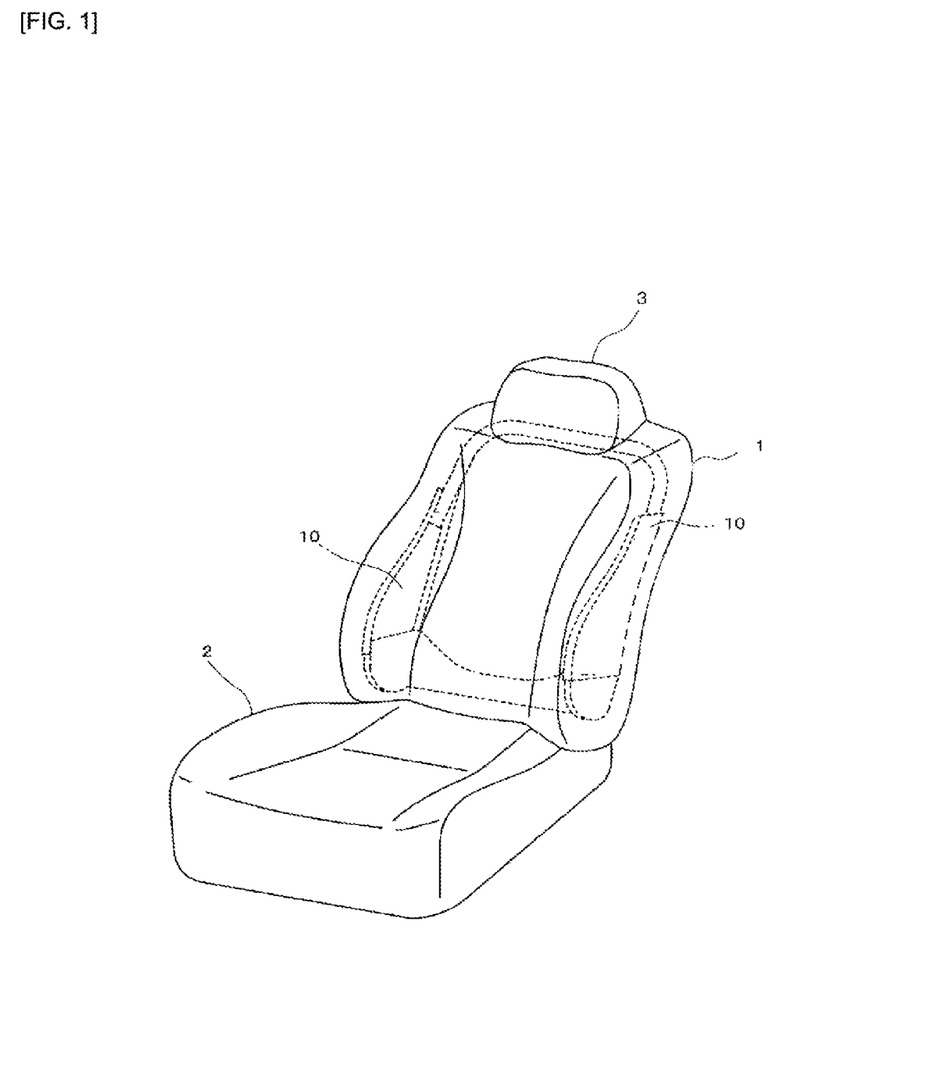
FIG. 1 is a perspective view primarily illustrating the external shape of the vehicle seat according to the present invention, where an airbag unit is not illustrated.
Figure 2:
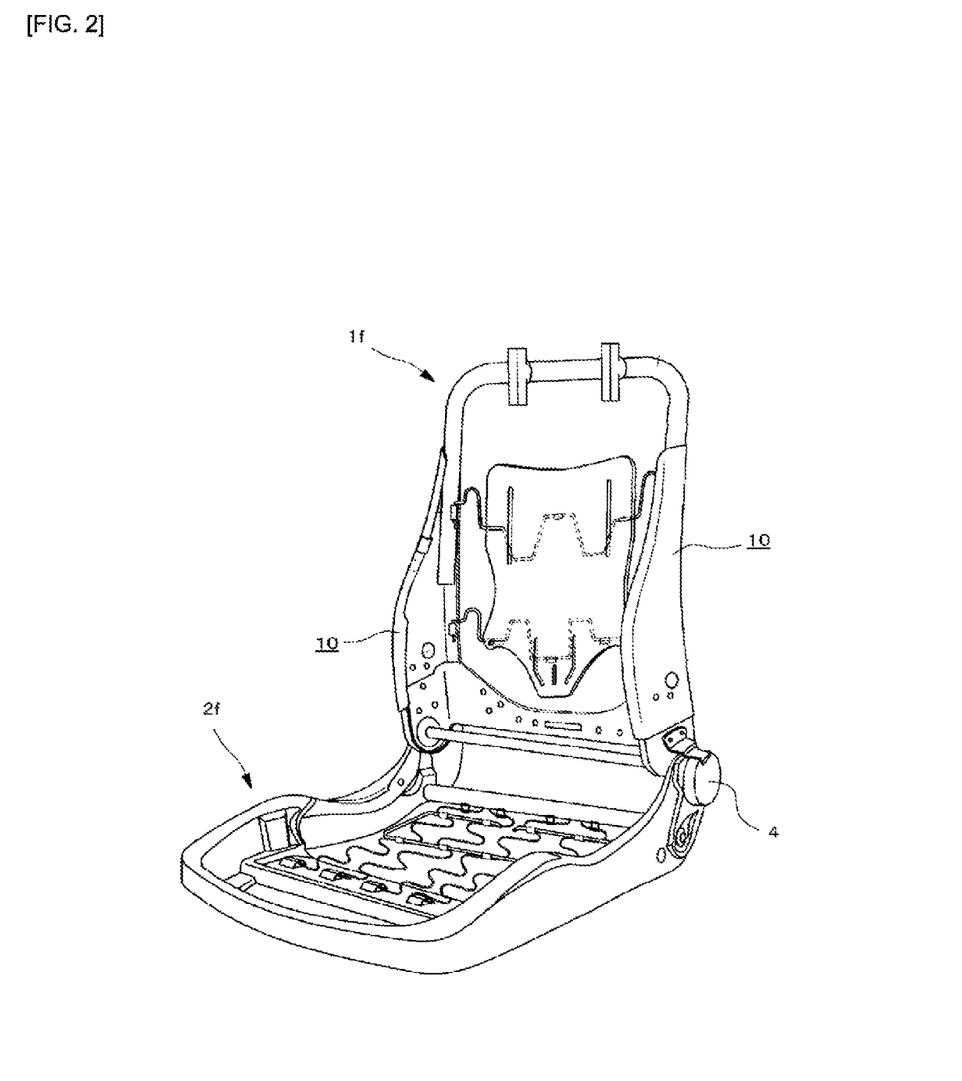
FIG. 2 is a perspective view illustrating the internal structure (seat frame) functioning as the framework of the vehicle seat illustrated in FIG. 1, with an illustration of the airbag unit omitted.

FIG. 1 is a perspective view primarily illustrating an external shape of a vehicle seat used as the vehicle seat according to the present invention, with an illustration of an airbag device (20) omitted. FIG. 2 is a perspective view illustrating an internal structure (seat frame) functioning as a framework of the vehicle seat illustrated in FIG. 1, with an illustration of the airbag device (20) also omitted herein.

Figure 3:
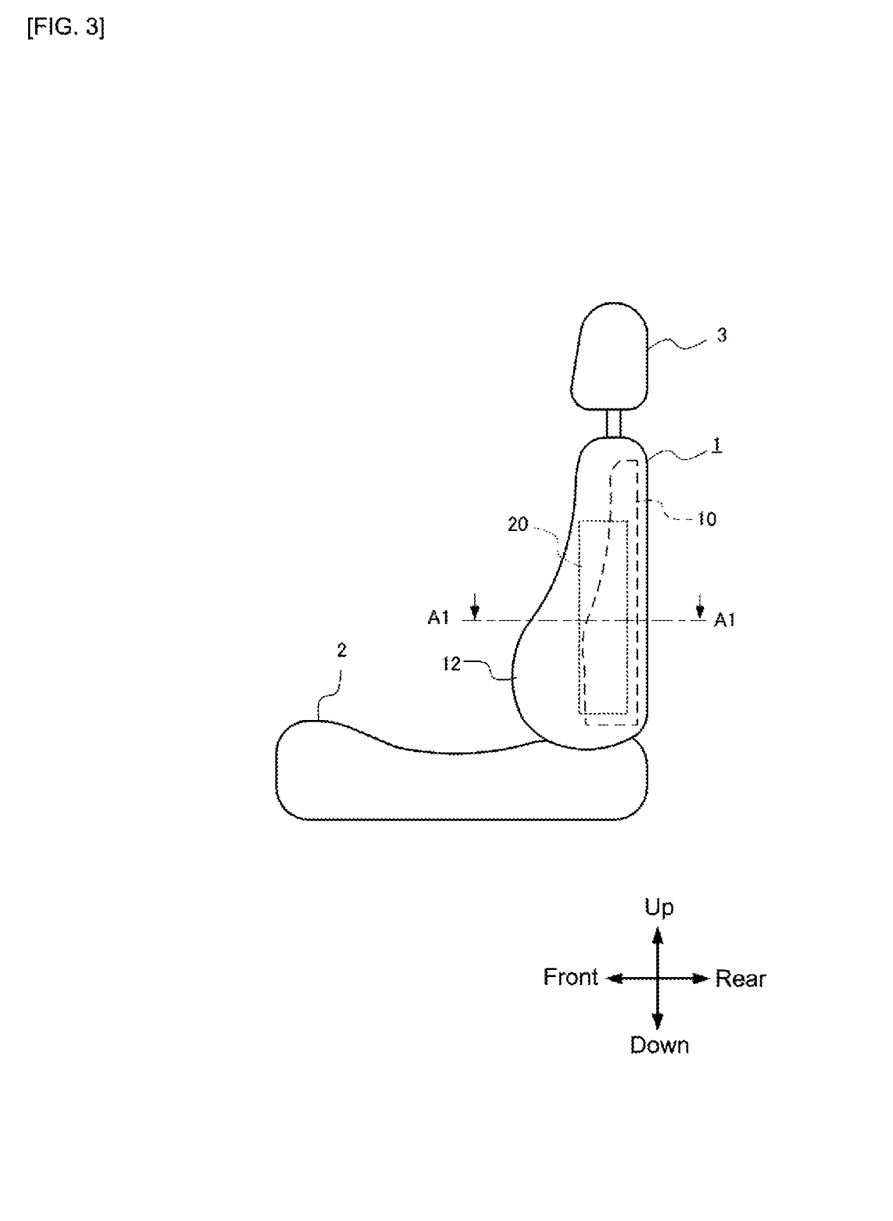
FIG. 3 is a schematic side view of the vehicle seat according to the present invention, illustrating the state in which the airbag unit is stowed when observed from the outside in the vehicle width direction.

FIG. 3 is a schematic side view of the vehicle seat according to the present invention, illustrating a view of the airbag device 20 stowed on the side (near side) near the door of the vehicle seat as observed from the outside in the vehicle width direction.

The present invention is a vehicle seat provided with a vehicle seat and a side airbag device (20) stowed in the seat. As illustrated in FIGS. 1 and 2, seen as the location, the vehicle seat according to the present example is configured by: a seat cushion 2 of a part on which an occupant is seated; a seat back 1 forming a backrest; and a headrest 3 connected to the upper end of the seat back 1.

A seat back frame 1f forming the skeleton of the seat is provided inside the seat back 1, while a pad made of a urethane foaming material, etc. is provided on the surface and periphery thereof, and the surface of this pad is covered with a skin 14 such as leather or fabric. A seating frame 2f is arranged on the bottom side of the seat cushion 2, while a pad made of a urethane foaming material, etc. is provided on the upper surface and periphery thereof, and the surface of this pad is covered with a skin 14 (FIG. 4) such as leather or fabric. The seating frame 2f and the seat back frame 1f are connected via a reclining mechanism 4.

As illustrated in FIG. 2, the seat back frame 1f is configured in a frame shape by: a side frame 10 arranged so as to be separated into the left and right and extending in a vertical direction; an upper frame connected to an upper end part of the side frame 10; and a lower frame connected to a lower end part thereof. A cushion member is provided outside a headrest frame to configure the headrest 3.

Figure 4:
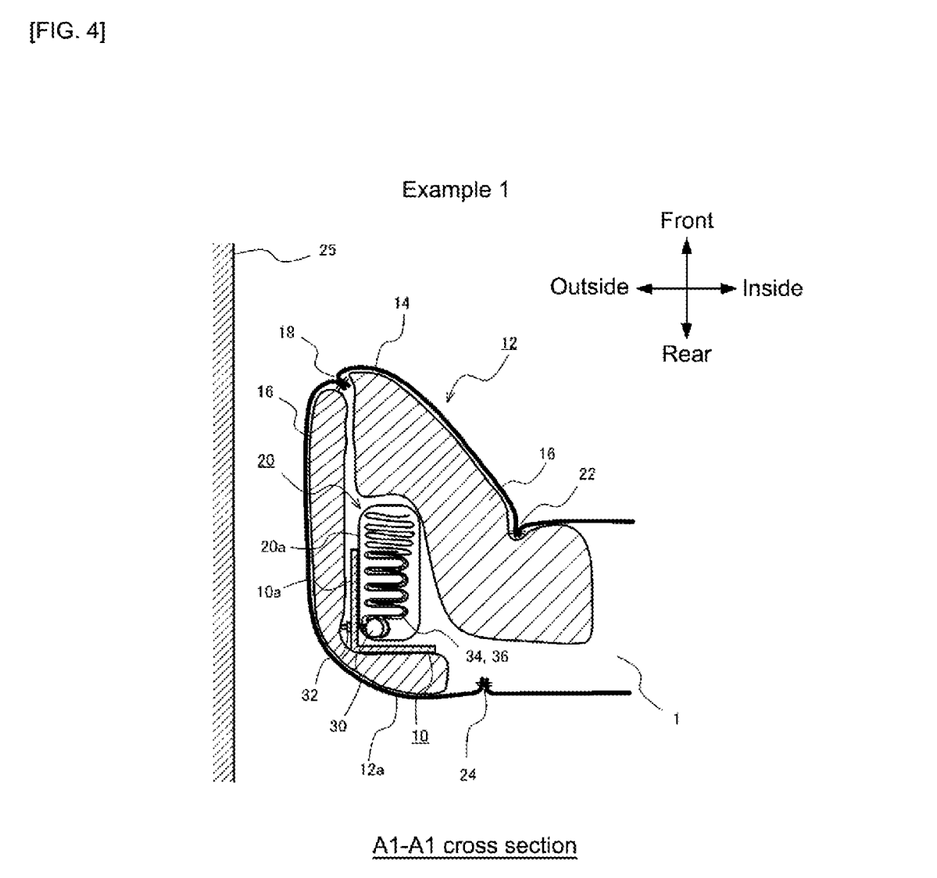
FIG. 4 is a cross sectional view illustrating the structure of the vehicle seat according to the present invention, corresponding to a part of a cross section in an A1-A1 direction of FIG. 3.
Figure 5:
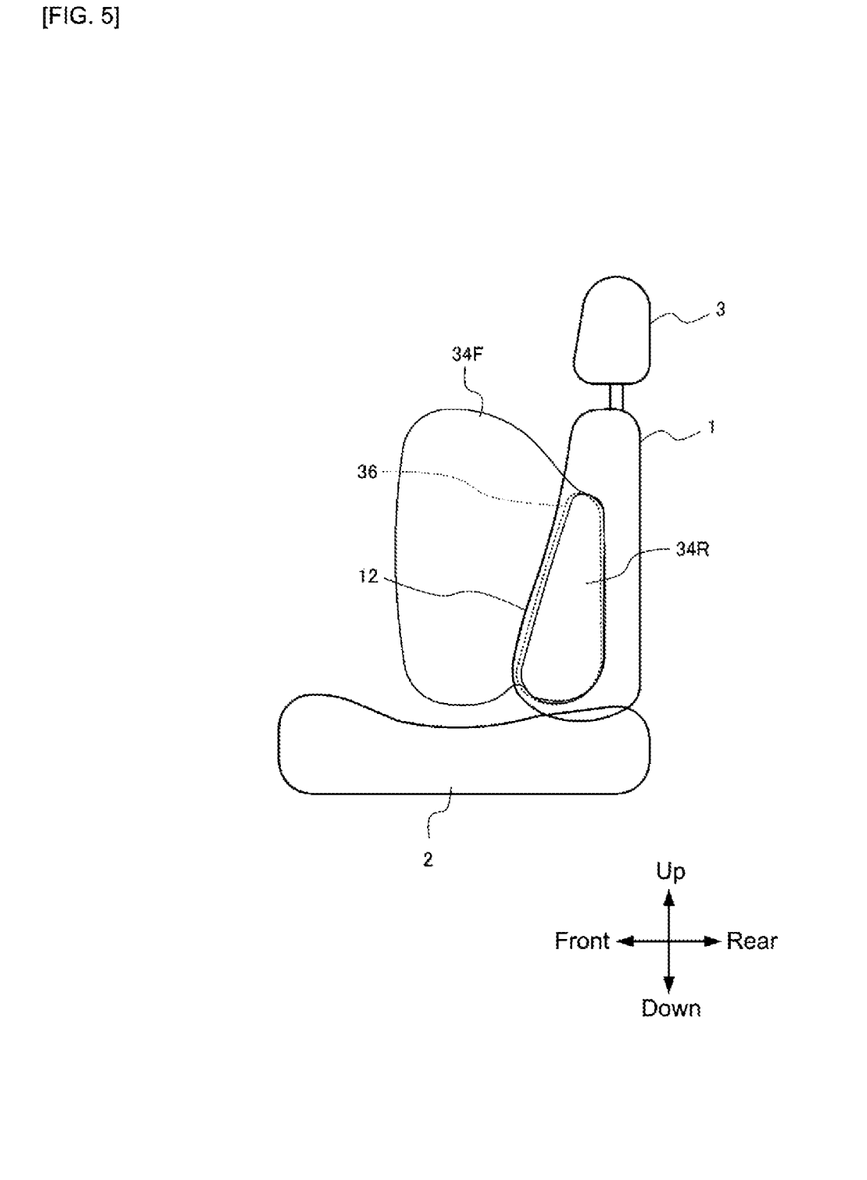
FIG. 5 is a schematic side view of the vehicle seat according to the present invention, illustrating a condition where the airbag is deployed as observed from the outside in the vehicle width direction.

FIG. 4 is a cross sectional view illustrating the structure of the vehicle seat according to an embodiment of the present invention, corresponding to a part of a cross section in the A1-A1 direction of FIG. 3. FIG. 5 is a schematic side view of the vehicle seat according to an embodiment of the present invention, illustrating a condition where the airbag is deployed as observed from the outside in the vehicle width direction.

The side frame 10 can be molded of resin or metal and, as illustrated in FIG. 4, can be formed into an L-shaped cross sectional shape or a U-shaped cross sectional shape. The side frame 10 includes a frame side wall part 10a extending in the vehicle traveling direction when the horizontal cross section is seen from above. Furthermore, the airbag module (side airbag device) 20 is secured on an inner side (seat center side) of the frame side wall part 10a.

As illustrated in FIG. 4, the seat back 1 includes a side supporting part 12 which swells in the vehicle traveling direction (vehicle front) on a vehicle width direction side part (end part). Inside the side support part 12, the side airbag apparatus 20 is housed in a gap with a urethane pad 16 not arranged therein. The side airbag device 20 is provided with airbags (34, 36) that restrain an occupant by expanding and deploying, and an inflator 30 that supplies expanding gas to the airbags (34, 36).

Seams 18, 22, 24 of the skin 14 of the seat back 1 are interwoven and connected by sewing. Note that the front seam 18 is cleft when the airbag is deployed.

The airbags (34, 36) are covered by a flexible cover 20a made of fabric. Regarding the relationship between the main chamber 34 and the sub-chamber 36, the airbags (34, 36) can be folded or rolled into a bellows shape ("folding" includes rolling), and other optimal compression methods can be employed as appropriate. In FIG. 4, the symbol 25 denotes a door trim.

As illustrated in FIG. 5, the airbags (34, 36) are provided with a main chamber 34 that deploys toward the front of the side support part 12, and a sub-chamber 36 that deploys to the inside of the main chamber 34 in the width direction of the vehicle.

Figure 6:
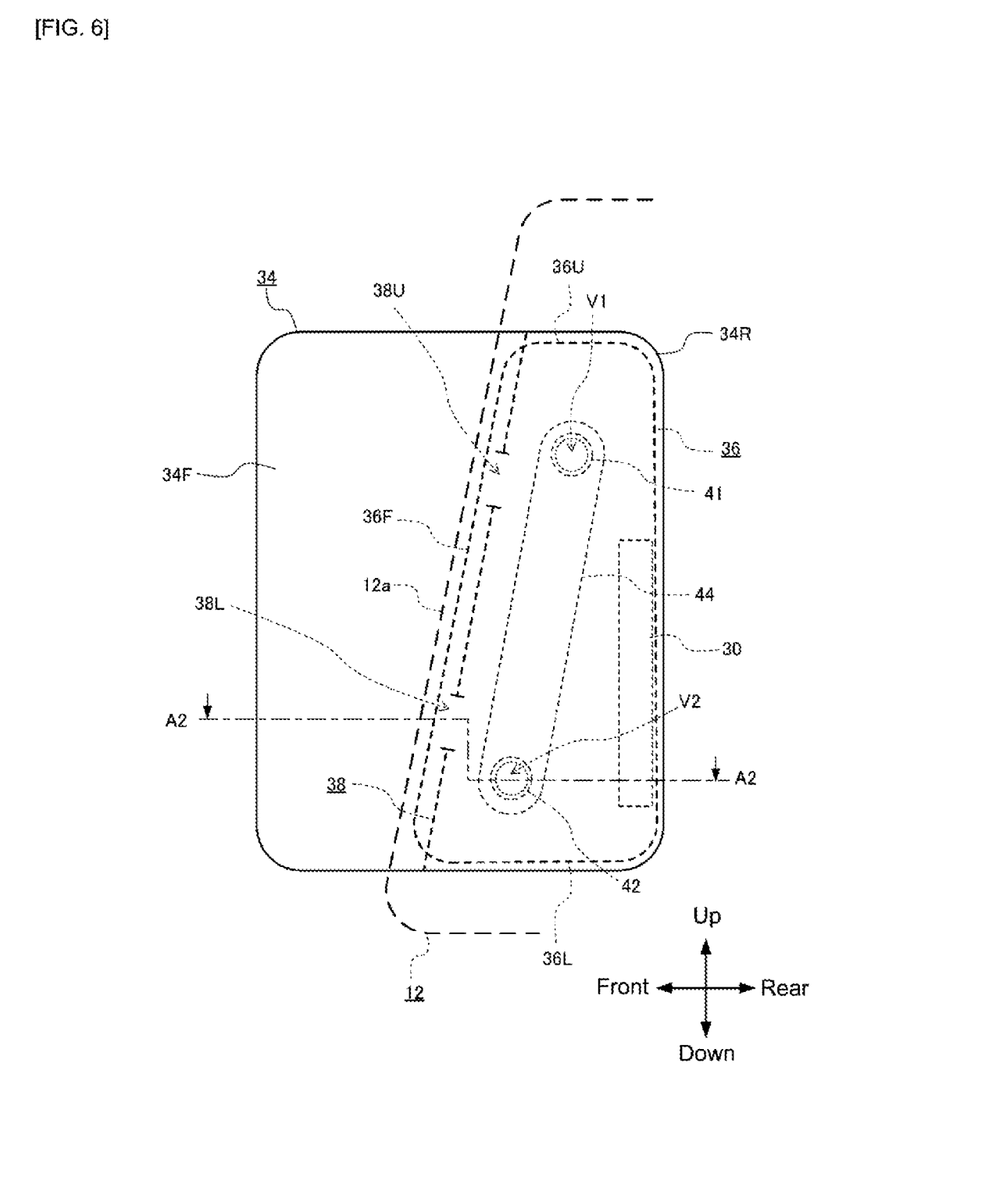
FIG. 6 is a schematic plan view schematically illustrating the structure of the airbag of the present invention.
Figure 7A:
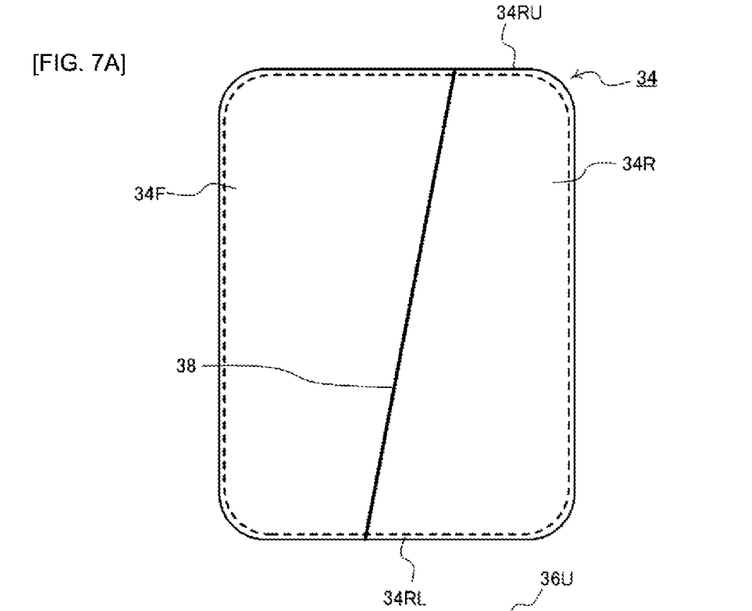
Figure 7B:
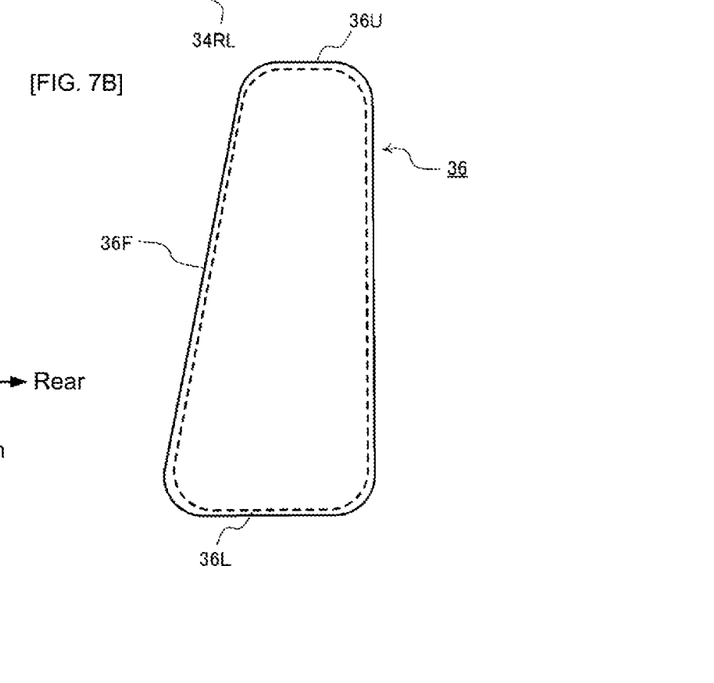
Figure 8:
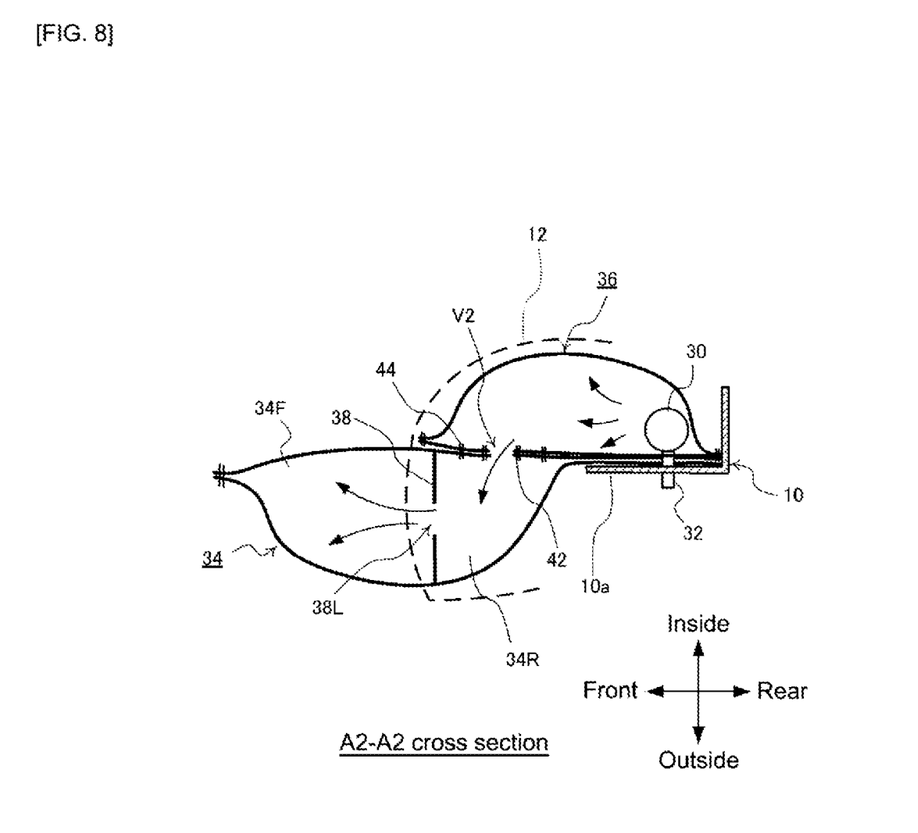
FIG. 8 is a cross-sectional view corresponding to the cross-section in the A2-A2 direction of FIG. 6 and illustrates the airbag in a deployed state.

FIG. 6 is a schematic plan view schematically illustrating the structure of the airbag of the present invention. FIG. 7 is a schematic plan view illustrating the panel structure of the airbag (before connection) according to the present invention, where (A) shows the main chamber 34 and (B) shows the sub-chamber 36. In addition, FIG. 8 is a cross-sectional view corresponding to the cross-section in the A2-A2 direction of FIG. 6 and illustrates the airbag in a deployed state.

In addition, as illustrated in FIG. 5, the airbags (34, 36) include a main chamber 34 that deploys toward the front of the side support part 12 and a sub-chamber 36 where the inflator 30 is stowed and deploys to the inside of the main chamber 34 in the vehicle width direction. The main chamber 34 can be formed, for example, by sewing two panels of the same shape together. In addition, the sub-chamber 36 can also be formed by sewing two panels of the same shape together. Note, in FIG. 8, the sewing points are indicated by two parallel thin lines.

As clearly illustrated in FIG. 6, the main chamber 34 is partitioned by a baffle panel 38 into a main front chamber 34F at the front and a main rear chamber 34R at the rear. The baffle panel 38 is a flexible fabric panel that partitions the space of the main chamber 34, for example, and can be formed of the same fabric as the airbag bodies (34, 36).

As illustrated in FIG. 6, the baffle panel 38, when deployed, is inclined in a straight line from the upper end to the lower end such that the upper part is positioned towards the rear side of the vehicle and the lower part is positioned towards the front side of the vehicle. Here, the lower side surface area (volume) of the deployed main rear chamber 34R and sub-chamber 36 is increased, and the waist of the occupant can be reliably restrained. The baffle panel 38 has vent holes 38U and 38L that connect to the main front chamber 34F and the main rear chamber 34R.

In the vehicle width direction, the sub-chamber 36 is connected to the main rear chamber 34R. In addition, the baffle panel 38, when deployed, is arranged and formed to extend along the front edge 36F of the sub-chamber 36 when viewed from the vehicle width direction. Furthermore, as shown in FIG. 5, the sub-chamber 36 and the main rear chamber 34R are configured to deploy only inside the side support part 12 and not to expand outside the vehicle seat, and only the main front chamber 34F is configured to expand outside the vehicle seat.

As illustrated in FIG. 6 and FIG. 7, the sub-chamber 36 and the main rear chamber 34R when deployed have a structure having generally the same shape and area when viewed from the vehicle width direction. Use of this type of structure enables the expansion gas to flow from the sub-chamber 36 to the main chamber 34 quickly and without waste. In the case where the sub-chamber 36 and the main rear chamber 34R are not of the same shape and area due to the arrangement of the inflator 30 or the like, the sub-chamber 36 is preferably formed so that at least the front edge 36F, the upper edge 36U, and the lower edge 36L of the sub-chamber 36 are each nearby and parallel to the front edge (baffle plate 38), the upper edge 34RU, and the lower edge 34RL of the main rear chamber 34R.

As illustrated in FIG. 6, the front edge 36F of the sub-chamber 36 when deployed can be structured to be in front of the front edge of the main rear chamber 34R, or the baffle panel 38, when viewed from the vehicle width direction.

Inner vents V1 and V2 through which the expansion gas passes are formed in the connection between the sub-chamber 36 and the main rear chamber 34R. These inner vents V1, V2 are arranged up and down along (parallel to) the baffle plate 38. Note, the number of inner vents is not limited to two, but can be three or more.

First seams 41, 42 are formed around the inner vents V1, V2 that connect the sub-chamber 36 and the main rear chamber 34R. A second seam 44 is formed so as to encircle the entirety of inner vents V1, V2. Furthermore, the sub-chamber 36 and the main rear chamber 34R are only connected by these first and second seams 41, 42, 44. In this manner, by not sewing the entire outer edge of the main rear chamber 34R and the sub-chamber 36, deployment of a first chamber is not prevented by the second chamber. In other words, interference between the main rear chamber 34R and the sub-chamber 36 can be minimized during deployment of the airbag, stabilizing deployment behavior of each chamber and providing the benefit of enabling ensuring sufficient thickness and improving impact absorption performance.

As illustrated in FIG. 6 and FIG. 8, the inflator 30 is stowed inside the sub-chamber 36 in the side airbag device of the present invention. As the inflator 30, for example, a cylindrical cylinder type inflator can be used. A pair of upper and lower stud bolts 32 protrude from the outer peripheral part of the inflator 30 towards the inside in the vehicle width direction. These stud bolts 32 are attached (fastened and fixed) to the side frame 10 by nuts. Multiple gas jet ports arranged in the peripheral direction are formed in the inflator 30, from which the gas is radially ejected. Note that a diffuser for controlling the flow of the gas can be provided as required.

An ECU for airbag control mounted in the vehicle is electrically connected to this inflator 30. A satellite sensor for detecting side collisions is electrically connected to this airbag control ECU. The inflator 30 can be configured to operate when the airbag control ECU detects a side collision based on a signal from this satellite sensor.

In the side airbag device configured as described above, when the sub-chamber 36 is inflated, the main rear chamber 34R is deployed in conjunction therewith, followed by deployment of the main front chamber 34F. Here, the sub-chamber 36 and the main rear chamber 34R deploy only inside the side support part 12 (see FIG. 5, FIG. 6 and FIG. 8).

Therefore, for example, even when a child seated in the vehicle seat is in a so-called out-of-position (OOP) state, such as when the child is seated facing the seat back or when the child is sitting covering the side support part 12, the occupant will not be seriously injured. In other words, the sub-chamber 36 and main rear chamber 34R, which are in close proximity to the occupant and are first to deploy, deploy only inside the side support 12 [sic], thus avoiding a situation in which they bulge out of the side support part 12 and directly apply a large impact on the occupant. On the other hand, the main front chamber 34F, which expands from the side support part 12 (seat), can reliably restrain the occupant's movement in the left-right direction over a wide area.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A vehicle seat comprising:
a seat cushion forming a seat surface and seatback forming a backrest, and a side airbag device, wherein
the seatback is provided with a side support part that bulges forward at the side part (end part) in the vehicle width direction,
a side frame extending along a longitudinal direction of the side support part is arranged inside the side support part,
the side airbag device is equipped with an airbag that restrains an occupant by expanding and deploying and an inflator that is provided on the inner side of the side frame in the vehicle width direction and supplies expansion gas to the airbag,
the airbag has a main chamber that deploys toward the front of the side support part and a sub-chamber that houses the inflator and deploys on the occupant side relative to the main chamber,
the main chamber is partitioned by a baffle panel into a main front chamber at the front and a main rear chamber at the rear,
the sub-chamber is connected to the main rear chamber in the vehicle width direction,
the baffle panel, when deployed, extends along the front edge of the sub-chamber when viewed from the vehicle width direction, and
the sub-chamber and the main rear chamber are configured to deploy only inside the side support part and not to expand outside the vehicle seat.

2. The vehicle seat according to claim 1, wherein, upon deployment, the baffle panel extends along the front edge of the side support part when viewed from the vehicle width direction.

3. The vehicle seat according to claim 1, wherein, upon deployment, the sub-chamber and the main rear chamber have approximately the same shape and area when viewed from the vehicle width direction.

4. The vehicle seat according to claim 1, wherein, upon deployment, the front edge of the sub-chamber is more forward than the front edge of the main rear chamber when viewed from the vehicle width direction.

5. The vehicle seat according to claim 1, wherein, upon deployment, the baffle panel is inclined in a straight line from the upper end to the lower end such that the upper part is positioned towards the rear side of the vehicle and the lower part is positioned towards the front side of the vehicle.

6. The vehicle seat according to claim 1, wherein a first inner vent through which the expansion gas passes is formed at a connection between the sub-chamber and the main rear chamber.

7. The vehicle seat according to claim 6, wherein said first inner vent is formed in at least two locations, upper and lower.

8. The vehicle seat according to claim 6, wherein a first seam connecting the sub-chamber and the main rear chamber is formed around the first inner vent.

9. The vehicle seat according to claim 8, wherein a second seam is formed so as to encompass the entirety of said first inner vent in at least two locations.

10. The vehicle seat according to claim 1, wherein the baffle panel is formed with a second inner vent that connects to the main front chamber and the main rear chamber.

11. A side airbag device equipped in the vehicle seat according to claim 1.

* * * * *